Patented Oct. 24, 1922.

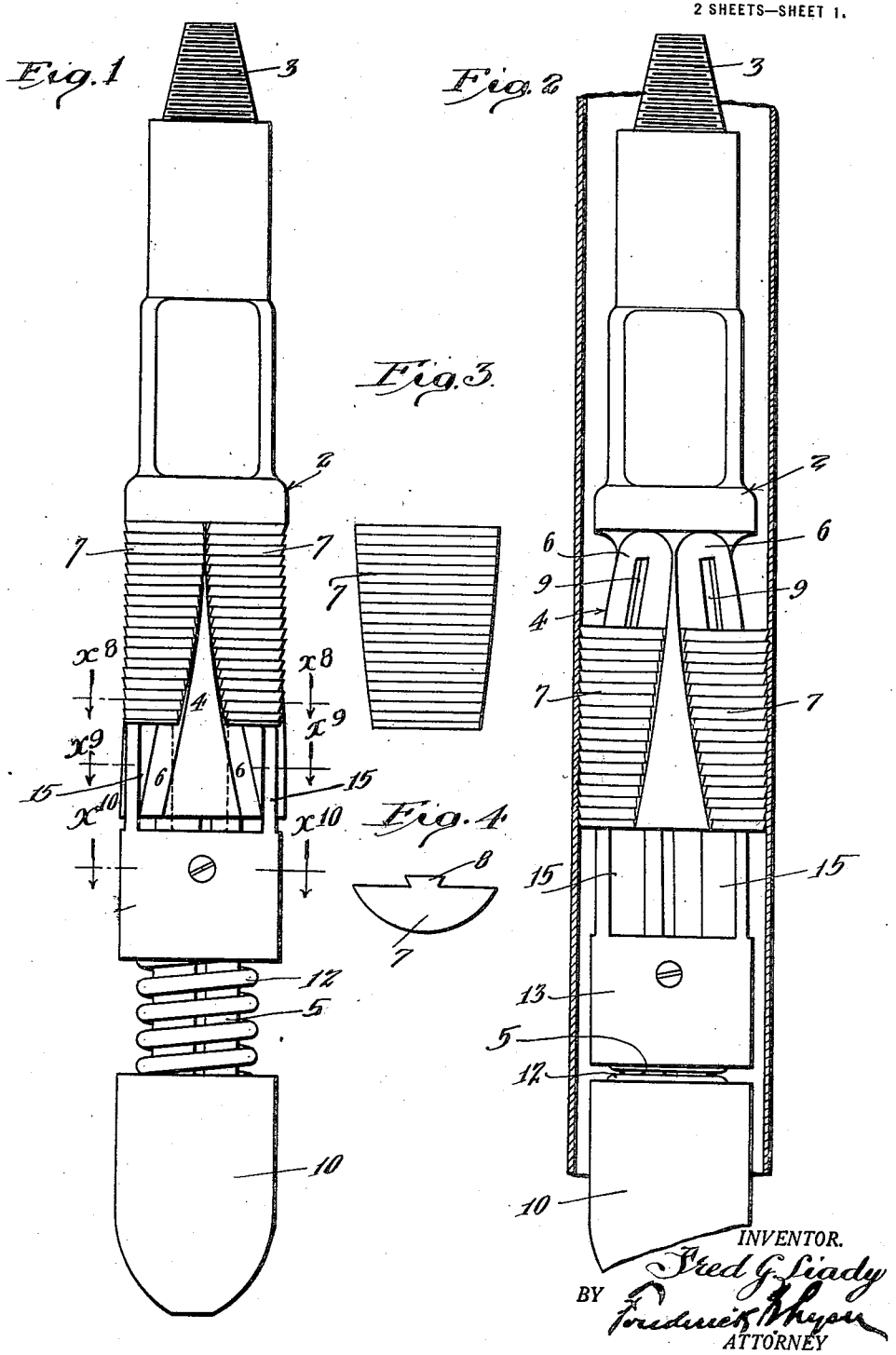

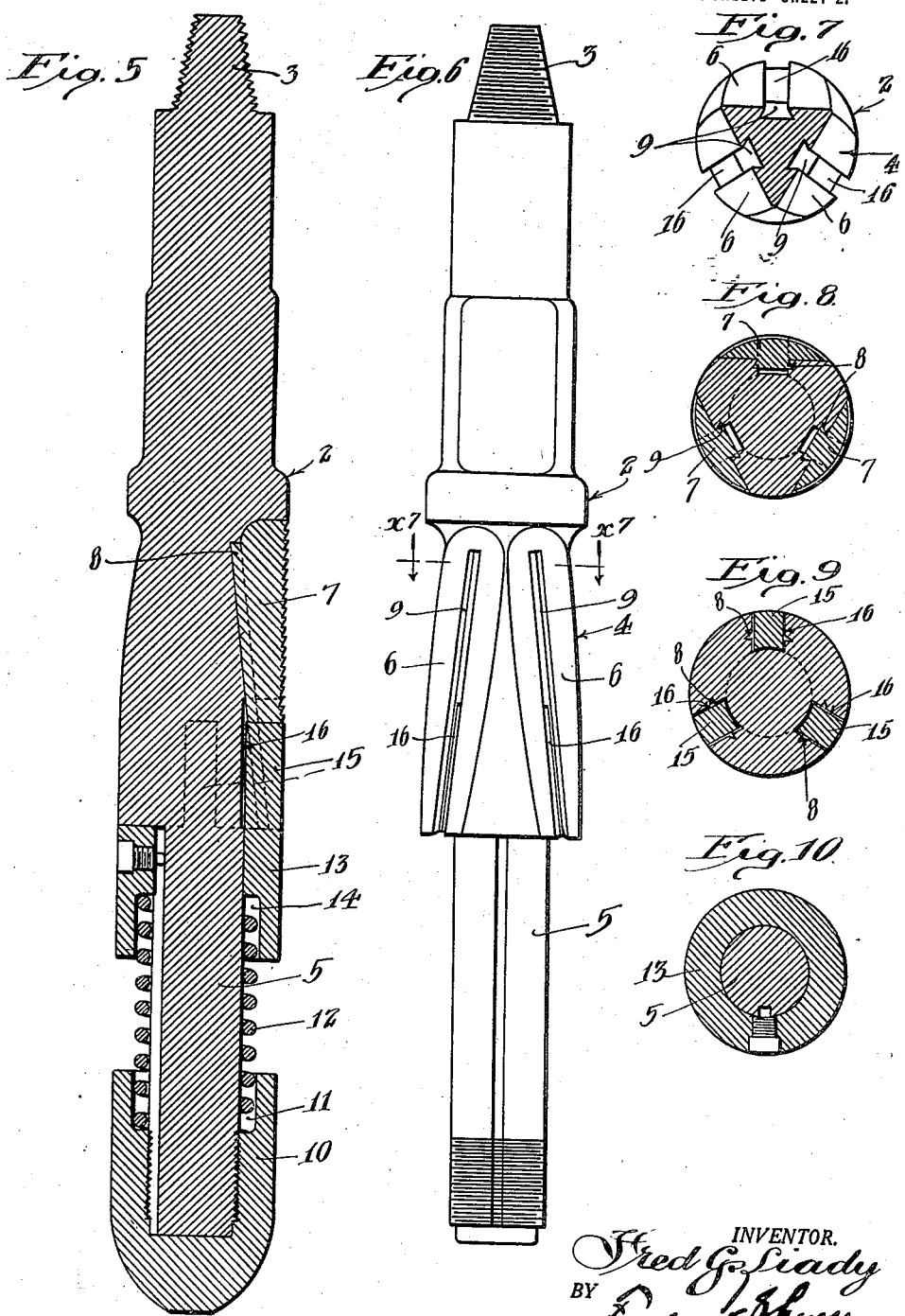

1,433,084

UNITED STATES PATENT OFFICE.

FRED G. LIADY, OF CISCO, TEXAS, ASSIGNOR OF ONE-HALF TO ALICE DOUBLE, OF LOS ANGELES, CALIFORNIA.

CASING SPEAR.

Application filed October 5, 1920. Serial No. 414,765.

*To all whom it may concern:*

Be it known that I, FRED G. LIADY, a a citizen of the United States, residing at Cisco, in the county of Eastland and State of Texas, have invented a new and useful Casing Spear, of which the following is a specification.

My invention relates to a casing spear adapted for engagement with the interior of a well casing for pulling upwardly thereon; and particularly to that type of casing spear in which the casing engaging means are actuated to casing engaging position by jarring up.

My invention pertains particularly to improvements in that type of casing spear comprising an expanding abutment having downwardly divergent ways formed thereon, slips slidably mounted on the ways, and a collar slidably mounted on a stem extending below the abutment, the collar being supported on a spring surrounding the stem and normally maintining the slips in retracted position. Such type of casing spear is in general use in the art. Difficulty has been had therewith by reason of the lower ends of the slips becoming distorted, rendering their release from the casing difficult and bull-dogging the spear in the casing. I have determined that the cause for such distortion of the ends of the slips is the fact that the slips of this type of casing spear are made equal in length to the length of the divergent ways. This incident of design has been found necessary in order that the sliding collar may abut the lower ends of the slips. It follows that when the slips are actuated to casing engaging position the lower ends of the slips overlap the lower end of the abutment. The lower ends of the slips being thus unprotected are subject to strain producing a bending of the projecting portions of the slips over the end of the abutment.

The particular object of my invention is to obviate the above described distortion of the slips.

A further object of my invention is to obviate the said distortion of the slips by simple and durable means readily incorporated in such type of casing spear.

The specific structure of my invention will be understood from the description of a typical form given in the following specification and illustrated in the accompanying drawings, in which:

Figure 1 is a side elevation of my device with its parts in normal non-casing engaging position.

Fig. 2 is a side elevation illustrating my device inserted within a well casing and with its parts in casing engaging position.

Fig. 3 is a side elevation of one of the slips utilized with my device.

Fig. 4 is an end view of said slip.

Fig. 5 is a vertical section of my device with its parts in normal non-casing-engaging position.

Fig. 6 is a side elevation of the mandrel included within my device.

Fig. 7 is a horizontal section taken on a line illustrated by $x^7$—$x^7$ in Fig. 6.

Fig. 8 is a horizontal section taken on a line illustrated by $x^8$—$x^8$ in Fig. 1.

Fig. 9 is a horizontal section taken on a line illustrated by $x^9$—$x^9$ in Fig. 1.

Fig. 10 is a horizontal section taken on a line illustrated by $x^{10}$—$x^{10}$ in Fig. 1.

In the drawings, 2 illustrates a mandrel provided with the usual means 3 at its upper end for attachment to a string of drilling tools. The mandrel 2 is formed with an expanding abutment 4 and a stem 5 extending below the abutment. The abutment is provided with downwardly divergent ways 6. Casing-engaging slips 7 are mounted on the ways 6 by dove-tails 8 formed on the slips, which dove-tails 8 engage coacting dove-tails 9 formed on the ways 6.

A nut 10 is threaded upon the lower end of the stem 5 and is provided with an annular groove 11. A spring 12 surrounds the stem 5 and is seated on the nut 10 within the groove 11.

A collar or sleeve 13 is slidably mounted on the stem 5 and is supported by the spring 12. The collar 13 is also provided with a groove 14 to receive the end of the spring 12.

The collar 13 carries upwardly projecting lugs or fingers 15. These lugs 15 are slidable within grooves 16 formed in the abutment 4 communicating with the dove-tails 9. The lower ends of the slips 7 abut the ends of the lugs 15. The slips 7 are shorter than the ways 6 and the lugs 15 normally maintain the slips 7 on the upper portion of the ways 6 with their lower ends spaced above the lower end of the abutment 4 a distance equal to the length of the lugs 15.

In operation the slips 7 are maintained on the upper portions of the ways 6 in non-casing engaging position by the lugs 15 under the tension of the spring 12. When it is desired to grip a casing the spear is jarred up, thereby causing the slips 7 and collar 13 to slide relatively downward against the tension of the spring 12. The slips will thus be expanded and wedge between the ways 6 and the casing, as illustrated in Fig. 2.

With my device the lower ends of the slips at no time overlap the end of the expanding abutment 4. The slips are thus protected against distortion because the same are supported on their inner sides at all points at all times.

While I have illustrated in the drawings a form of my device having three casing-engaging slips, the particular number of such slips is immaterial so far as my invention is concerned. Likewise, my invention is not limited to the specific construction of the device illustrated in the drawings, in which I have illustrated details and portions of construction comprising a preferred but not essential embodiment of my invention.

I claim:

1. A casing spear comprising a mandrel having an expanding abutment and a stem extending below the abutment, downwardly divergent ways formed on the abutment, slips slidably mounted on said ways, a collar slidably mounted on the stem, a nut on the lower end of the stem, a spring surrounding the stem between the collar and the nut for supporting the collar, and lugs carried by the collar and projecting within slots formed on the abutment, the lugs normally engaging and maintaining the slips on the upper portions of the ways.

2. A casing spear having an expanding abutment, downwardly divergent ways formed on the abutment, slips slidably mounted on the ways, said slips being shorter than the ways, a collar, spring means slidably supporting the collar, and upwardly projecting lugs carried by the collar and adapted to normally engage and maintain the slips on the upper portions of the ways, whereby the slips when actuated to gripping position will not overlap the lower end of the abutment.

Signed at Los Angeles, California this 24th day of September, 1920.

FRED G. LIADY.

Witnesses:
LEONARD S. LYON,
L. BELLE WEAVER.